Figure 1:
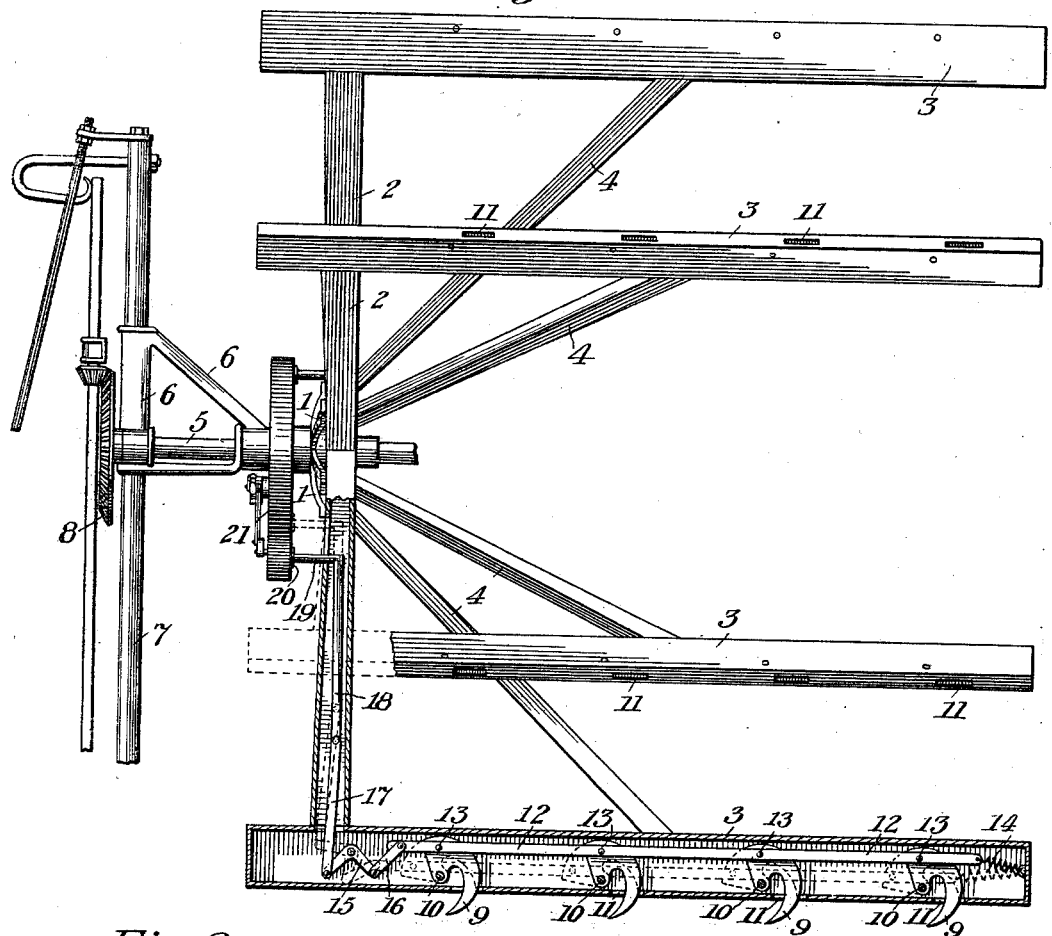

No. 670,662. Patented Mar. 26, 1901.
C. BRANSGROVE.
HARVESTER REEL.
(Application filed Sept. 27, 1900.)
(No Model.)

Witnesses,
R. A. Balderson
L. E. Tibbetts

Inventor,
Charles Bransgrove,
By Rexford M. Smith
Attorney.

THE NORRIS PETERS CO., PHOTO-LITHO., WASHINGTON, D. C.

UNITED STATES PATENT OFFICE.

CHARLES BRANSGROVE, OF LULU, MICHIGAN.

HARVESTER-REEL.

SPECIFICATION forming part of Letters Patent No. 670,662, dated March 26, 1901.

Application filed September 27, 1900. Serial No. 31,273. (No model.)

*To all whom it may concern:*

Be it known that I, CHARLES BRANSGROVE, a citizen of the United States, residing at Lulu, in the county of Monroe and State of Michigan, have invented a certain new and useful Harvester-Reel, of which the following is a specification, reference being had therein to the accompanying drawings.

This invention relates to harvester-reels; and the object in view is to provide a reel of novel construction, the same being equipped with series of hooks carried by and housed within the beaters or blades and so arranged and connected with the operating mechanism that the hooks of each beater will be automatically and simultaneously thrown outward just in advance of the cutting apparatus for the purpose of picking up fallen grain and depositing the same on the platform or endless carrier, by which the grain is delivered to the binding apparatus.

The detailed objects and advantages of the invention will appear more fully in the course of the ensuing description.

The invention consists in a harvester-reel embodying certain novel features and details of construction and arrangement of parts, as hereinafter fully described, illustrated in the drawings, and incorporated in the claims.

Figure 2:
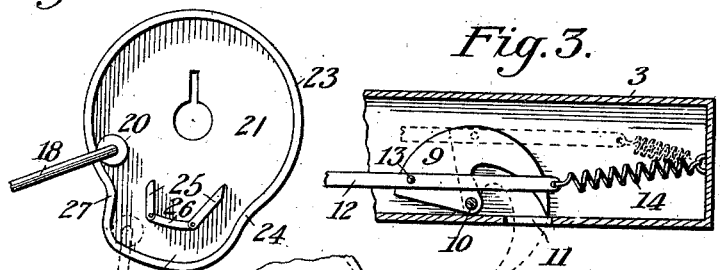
Figure 3:
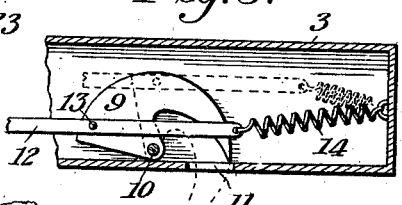
Figure 4:
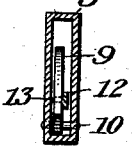
Figure 5:
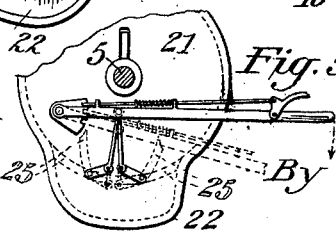

In the accompanying drawings, Figure 1 is a front elevation of a reel constructed in accordance with the present invention. Fig. 2 is a detail view of the stationary cam, showing the trip and a portion of the hook-operating mechanism. Fig. 3 is a detail longitudinal section through the outer end of one of the beaters, showing one of the hooks and a portion of the operating mechanism. Fig. 4 is a cross-section through the beater, taken adjacent to the inner end. Fig. 5 is a detail elevation of the cam or face plate, showing the trip or switch operating mechanism.

Similar numerals designate corresponding parts in the several views.

The reel contemplated in this invention resembles in its general appearance and make-up the ordinary reel employed at the present time on grain-binding harvesters, comprising, essentially, a hub 1, arms or spokes 2 radiating therefrom, beaters 3, and diagonal braces 4, interposed between the arms and beaters. The reel as a whole is mounted upon a reel-shaft 5, journaled in a bracket 6, supported on a standard 7, the shaft 5 being provided with a gear-wheel 8, by means of which it is operatively associated with the reel-driving mechanism, which may be of any ordinary or preferred construction.

In carrying out the present invention the arms 2 and the beaters 3 are made hollow to form housings for the grain-hooks and the hook-operating mechanism. Within each of the beaters 3 is arranged a series of arc-shaped hooks 9, each of which is pivotally mounted at 10 within the beaters and operates through an opening 11 in the outer edge or side of the beater. Associated with each and all of the hooks of each series is a common operating-bar 12, pivotally connected at 13 with each hook, so that as the bar is oscillated or moved lengthwise all the hooks are simultaneously thrust outward or retracted, as the case may be. At the outer end of the bar 12 is a hook-thrust spring 14, having one end attached to the outer end of the beater, as clearly shown in Figs. 1 and 3. This spring exerts its tension to draw the bar 12 outward toward the outer end of the beater, causing it to assume the position shown in Fig. 1 and rocking the hooks to the position shown in the same figure.

In order to retract the hooks, an elbow-lever 15 is mounted within the beater, adjacent to its inner end, and has one arm connected by a link 16 with the operating-bar 12, while its outer arm has pivotally connected thereto a rod 17, which pivotally connects with a slide-rod 18, extending lengthwise within one of the hollow arms 2. The inner end of the slide-rod 18 is provided with an angular extension or bent portion 19, upon which is journaled a roller 20, which travels within a stationary cam or face plate 21, mounted fast upon the bracket 6, hereinabove referred to. The cam is provided adjacent to its bottom with a pendent offset portion 22, which will permit the roller 20 to drop the necessary distance. The cam also embraces a surrounding flange 23, which serves to guide the roller 20 and prevent its escape. The major portion of the flange 23 is concentric with the reel-shaft, while the offset portion 22 permits the roller 20 to drop and enables the hook-thrust spring 14 to actuate the common operating-bar 12 and thrust outward the hooks 9 just as they approach the cutting apparatus, the hooks being retracted as the roller 20 reaches that portion of the flange 23 indicated at 24, the hooks in the meantime having passed over the cutting apparatus, so as to deposit the picked-up grain on the platform, where it is carried in a manner which will be readily understood.

It is to be understood that similar operating mechanism for each series of hooks 9 will be employed and that each series of hooks will be thrust outward as the rollers 20 drop into the offset portion 22 of the stationary cam.

In order to throw the hooks out of operation, one or more switches 25 are provided, which, together with an intervening web 26, form a continuation of the concentric portion of the flange 23, as illustrated in Fig. 2, in which figure, however, the switches are shown as moved to the position which will enable the rollers 20 to follow the flange 23. By moving the switches 25 so that their extremities will rest against the points 24 and 27 of the flange 23 the rollers 20 will be prevented from falling into the offset 22, and consequently the hooks will not be thrust outward, but will remain housed within their respective beaters. Any suitable device, such as a lever, may be employed for enabling the operator to move the switches 25 to either position.

By means of the construction described the hooks 9 are adapted to pick up the fallen grain and convey it from the cutter-bar to the platform or endless carrier, from whence it is delivered to the binding apparatus, the outer edge of the beaters serving to clear the grain from the hooks as they are retracted into the beaters. The operation of the hooks is simultaneous and automatic, requiring no attention on the part of the driver.

Having thus described the invention, what is claimed as new, and desired to be secured by Letters Patent, is—

1. A harvester-reel comprising hollow beaters, a series of hooks mounted and housed within each beater, a hook-thrust spring for throwing the hooks outward, and means for automatically retracting said hooks, substantially as described.

2. A harvester-reel comprising hollow beaters, series of hooks pivotally mounted and housed therein, a common operating-bar for each series of hooks, and means for automatically moving each of said bars successively and causing it to operate simultaneously upon all the hooks of its beater, substantially as described.

3. A harvester-reel comprising hollow beaters, a series of hooks pivotally mounted and housed within each beater, a stationary cam, and connections between said cam and hooks whereby each series of hooks is automatically thrown outward and retracted, substantially as described.

4. A harvester-reel comprising hollow beaters and hollow arms or spokes, a series of hooks pivotally mounted and housed within each beater, common operating-bars one associated with each series of said hooks, a hook-thrust spring connected to said bar, an elbow-lever operatively connected with said bar, a stationary cam or face plate adjacent to the hub of the wheel, and operative connections between said cam and elbow-lever, said connections being housed within one of the hollow arms of the reel, substantially as described.

5. A harvester-reel comprising beaters, in combination with a series of pivoted hooks carried by each beater, a stationary cam, connections between said cam and hooks for operating the latter, and one or more switches mounted on the cam, by shifting which the hooks may be thrown into or out of operation, substantially as described.

6. A harvester-reel comprising beaters, in combination with a series of pivoted hooks carried by each beater, a stationary cam, connections between said cam and hooks for operating the latter, one or more switches mounted on the cam, and means for shifting said switches to throw the hooks into and out of operation, substantially as described.

In testimony whereof I affix my signature in presence of two witnesses.

CHARLES BRANSGROVE.

Witnesses:
A. W. PAYNE,
A. HADNETT.